United States Patent [19]
Young

[11] Patent Number: 5,918,624
[45] Date of Patent: Jul. 6, 1999

[54] GAS METER QUICK CHANGE METER BAR

[76] Inventor: William C. Young, 12305 N. Green River Rd., Evansville, Ind. 47711-9786

[21] Appl. No.: 09/041,515

[22] Filed: Mar. 12, 1998

[51] Int. Cl.[6] ............................. F16K 43/00; F16K 11/20
[52] U.S. Cl. ............................. 137/315; 73/201; 137/606
[58] Field of Search ............................ 137/15, 315, 605, 137/606; 73/201; 285/30

[56] References Cited

U.S. PATENT DOCUMENTS

| | | | |
|---|---|---|---|
| 2,579,656 | 12/1951 | Douglas et al. | 73/201 |
| 3,187,570 | 6/1965 | Mueller | 73/201 |
| 3,245,257 | 4/1966 | Anderson | 73/201 |
| 3,256,735 | 6/1966 | Smith | 73/201 |
| 3,266,308 | 8/1966 | Howarth | 73/201 |
| 3,272,009 | 9/1966 | Leopold, Jr. et al. | 73/201 |
| 3,296,860 | 1/1967 | Smith et al. | 73/201 |
| 3,296,861 | 1/1967 | Mueller et al. | 73/201 |
| 3,382,888 | 5/1968 | Mueller et al. | 73/201 |
| 5,042,528 | 8/1991 | England et al. | 73/201 |
| 5,437,300 | 8/1995 | Winnie et al. | 73/201 |

Primary Examiner—George L. Walton

[57] ABSTRACT

The present invention is a method and a means of changing gas meters without interrupting gas service. The present invention is a gas meter quick change meter bar that includes a supply pipe connected to a mount bar that attaches for support to the gas meter, a transfer valve assembly, and a temporary supply valve assembly. The transfer valve assembly is permanently mounted to the mount bar and contains a transfer valve that normally permits gas flow from the meter into a user's building. The transfer valve can be moved to a position that shuts off flow from the meter, and opens to a supply from a temporary supply tank. The transfer valve is moved by rotating a handle in the temporary supply valve assembly.

2 Claims, 5 Drawing Sheets

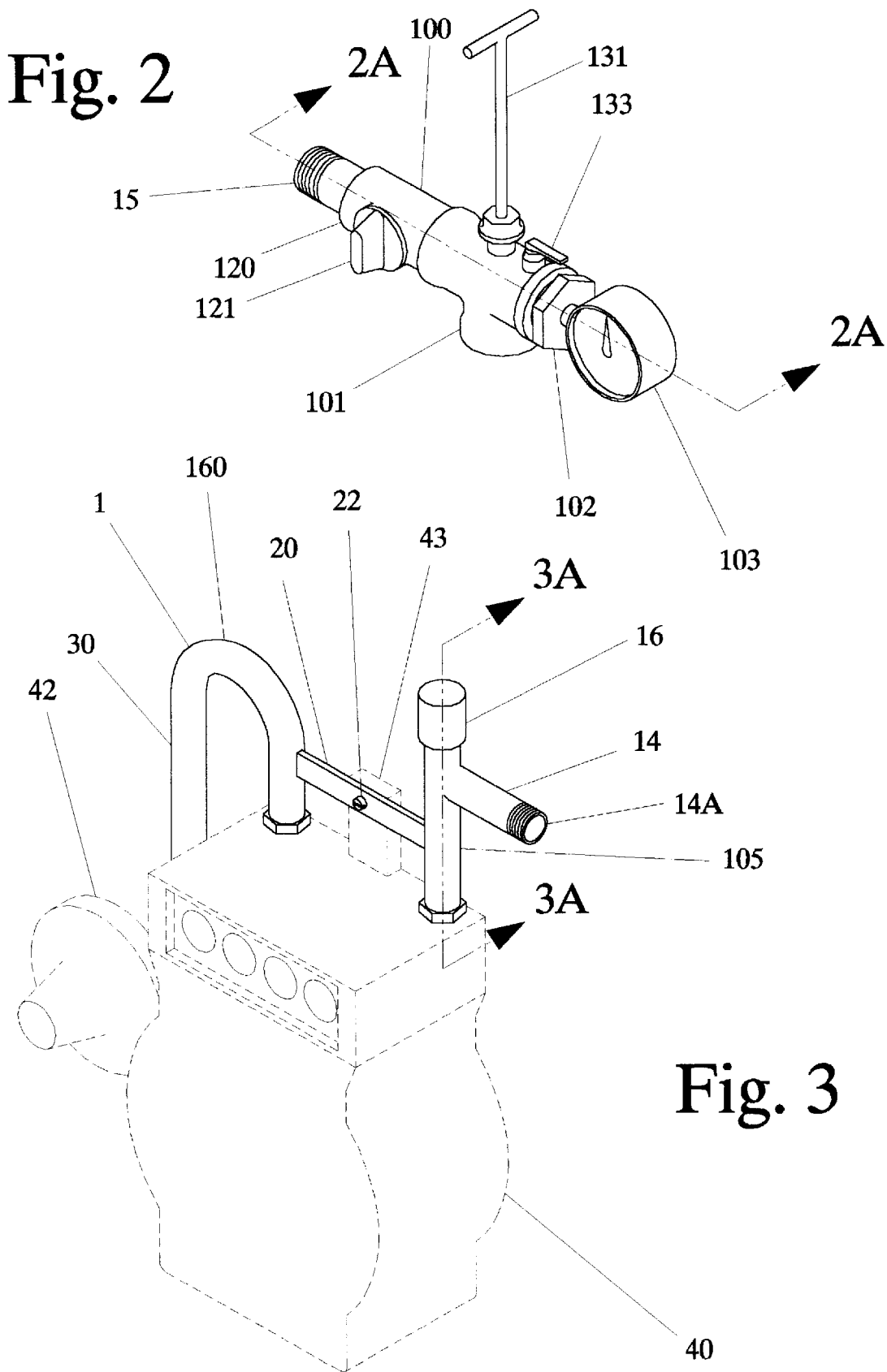

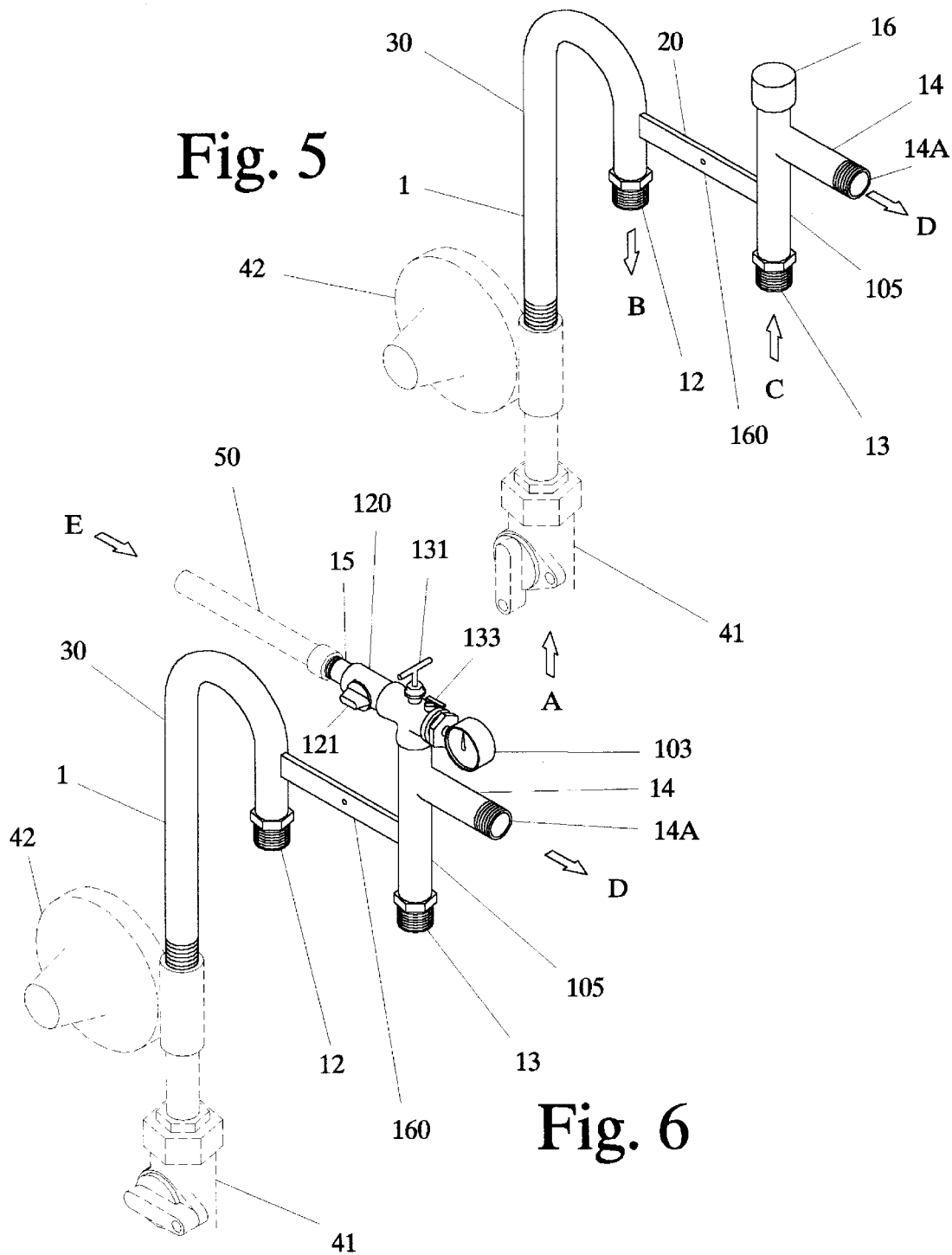

GAS METER QUICK CHANGE METER BAR

CROSS-REFERENCES TO RELATED APPLICATIONS

None.

STATEMENT AS TO RIGHTS TO INVENTIONS MADE UNDER FEDERALLY-SPONSORED RESEARCH AND DEVELOPMENT

Not applicable.

BACKGROUND OF THE INVENTION (1) Field of the Invention

The present invention is a device that combines a mounting arrangement with a valving arrangement that permits the replacement, or changing of a gas meter such as is used for measuring natural gas usage by a customer without interrupting gas service to the customer.

(2) Description of the Prior Art

While there are many devices proposed to accomplish the desired purpose of permitting the replacement or changing of a gas meter without interrupting gas service to a customer, these devices were too complicated and too expensive for general adoption. As will be seen from the subsequent description of the embodiments of the present invention, the shortcomings of the prior art are overcome.

SUMMARY OF THE INVENTION

The present invention is a device with a movable ball valve that permits the utilization of a tank of compressed natural gas to supply the customer through a meter bar while a gas meter is being replaced.

BRIEF DESCRIPTION OF THE DRAWINGS

FIG. 2 is an illustration of a temporary supply valve assembly.

FIG. 3 illustrates a meter bar assembly installed on a gas meter.

FIG. 5 illustrates directions of gas flow through the meter bar assembly during normal gas usage by a customer.

FIG. 6 illustrates direction of temporary gas flow, during a meter replacement operation.

DESCRIPTION OF THE PREFERRED EMBODIMENTS

Figure 1:
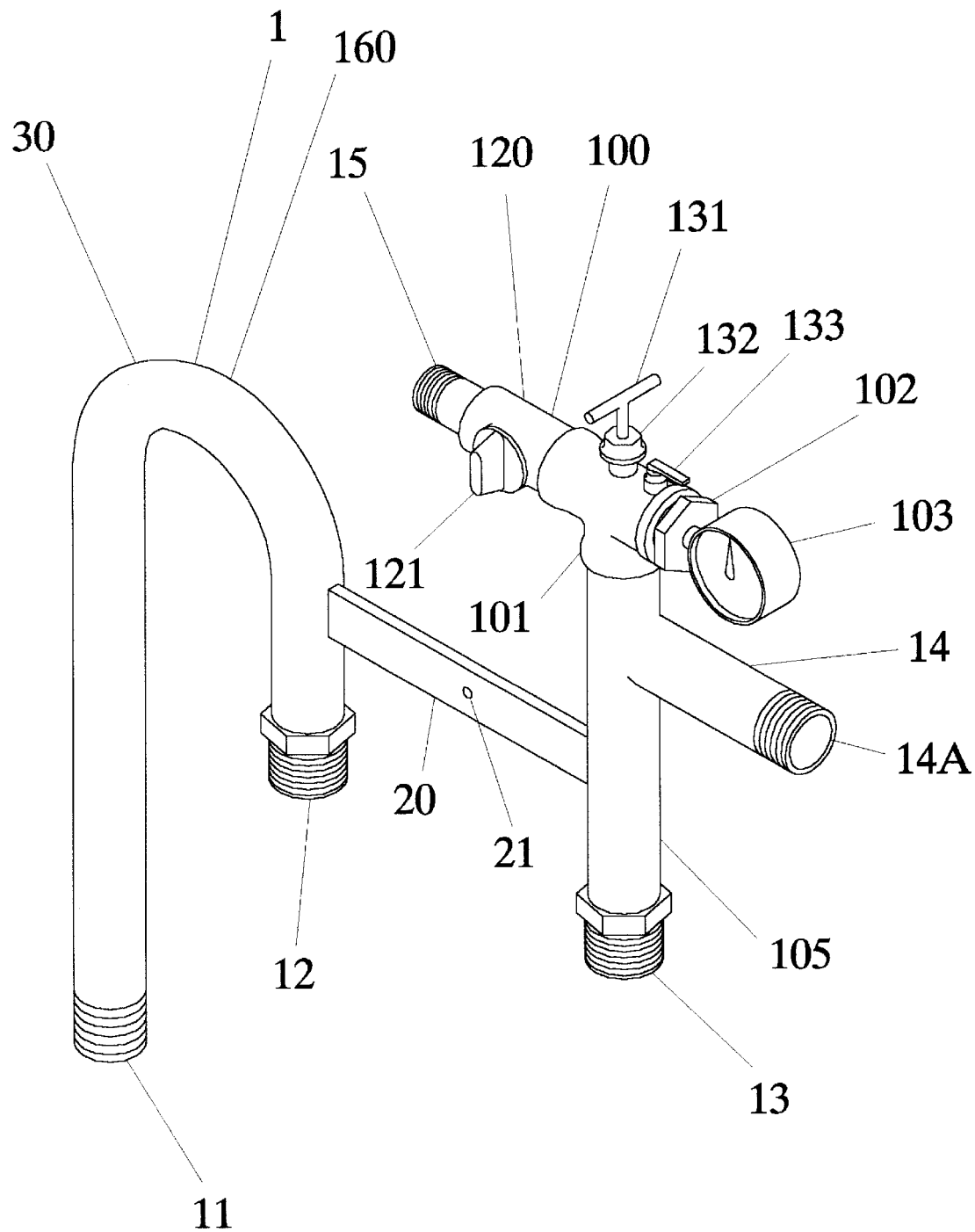
FIG. 1 is an illustration of the present invention.

Referring to FIG. 1, the present invention, a gas meter quick change meter bar 1, includes a temporary valve assembly 100 and a meter bar assembly 160.

Figure 2A:
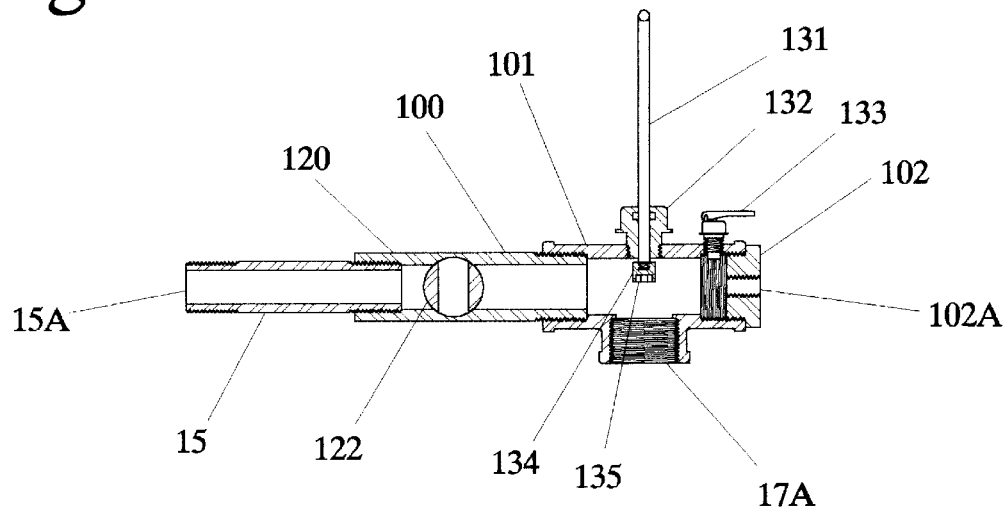
FIG. 2A is a cross section view of the temporary valve assembly shown in FIG. 2.

Referring to FIGS. 1, 2, and 2A, the temporary supply valve assembly 100 includes a temporary gas supply inlet stem 15 with an temporary gas supply gas inlet 15A, a temporary supply valve assembly gas outlet 17A, a main housing 101, and an end cap 102 with a threaded clearance for a pressure guage 102A, a pressure gauge 103 which mounts in the threaded clearance for a pressure gauge 102A, a temporary supply shutoff valve 120 with a handle 121, a transfer valve actuating "tee" handle 131, a packing nut 132, a purge valve 133, and a transfer valve mating block 134 that includes a hex socket 135. FIG. 2A includes a cutaway detail 122 of a ball valve embodiment of the temporary supply shutoff valve 120.

Referring to FIG. 1, the meter bar assembly 160 includes a regulator-to-meter supply pipe 30 a mount bar 20, and a transfer valve assembly 105. The regulator-to-meter supply pipe 30 includes a gas inlet from regulator 11 and a gas outlet to meter 12, both of which include appropriate male or female threads or thread couplers as required by a given type of meter to be serviced. Different meters installed at different times and places have different kinds of threaded connections.

Referring to FIGS. 1 and 3, the mount bar 20 includes a clearance 21 for a mount screw 22 for attachment to a prior art gas meter 40. This attachment of the mount bar 20 to the prior art gas meter 40 provides some structural support to the meter bar assembly 160 as the mount bar 20 is affixed to the supply pipe 30 and also the transfer valve assembly 105 of the meter bar assembly 160. The gas meter 40 and a regulator 42 are shown in dotted lines in FIG. 3 as they are not a part of the present invention.

Figure 3A:
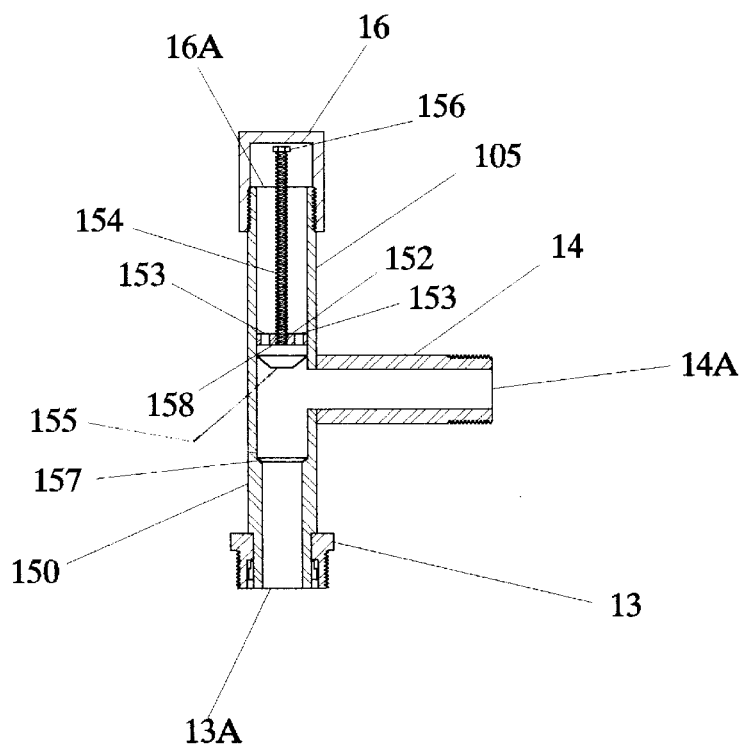
FIG. 3A is a cross section view of a transfer valve assembly with the transfer valve is in a normally operating position.

Referring to FIGS. 1, 3 and 3A, the transfer valve assembly 105 includes a gas inlet coupling from meter 13, a gas inlet from meter 13A, a house supply outlet stem 14 with a house supply gas outlet 14A, a transfer valve cap 16, a transfer valve gas inlet 16A, the transfer valve housing 150, a transfer valve mount threaded plug 152 with gas flow clearances 153, a transfer valve threaded stem 154, a transfer valve 155, a transfer valve actuating head 156, and a transfer valve primary sealing seat 157.

In FIG. 3A the transfer valve threaded actuating stem 154 is shown in its normal operating position seated against the transfer valve mount threaded plug 152, sealing against the gas flow clearances 153.

Figure 3B:
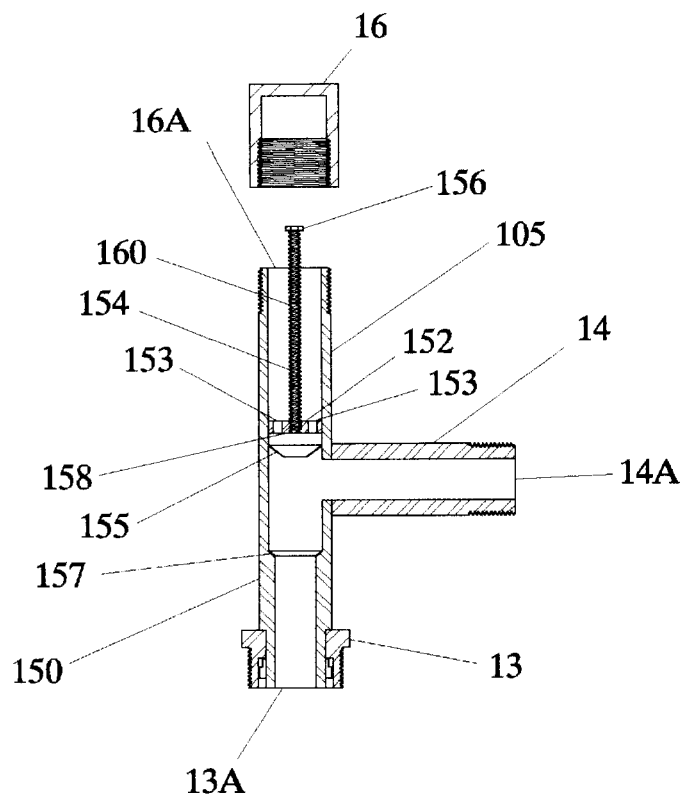
FIG. 3B is a cross section view of the transfer valve assembly with the transfer valve in an alternate position.

When the gas meter 40 is to be replaced or changed, the gas meter quick change meter bar 1 is used as follows:

1. The transfer valve cap 16 (Ref. FIG. 3B) is removed from the transfer valve assembly 105. As the transfer valve 155 (Ref. FIG. 3A) is in its normal operating position indicated. No gas escapes as the transfer valve 155 acts as a seal against the gas flow clearances 153, at the sealing surface 158, in the transfer valve mount threaded plug 152.

Figure 4:
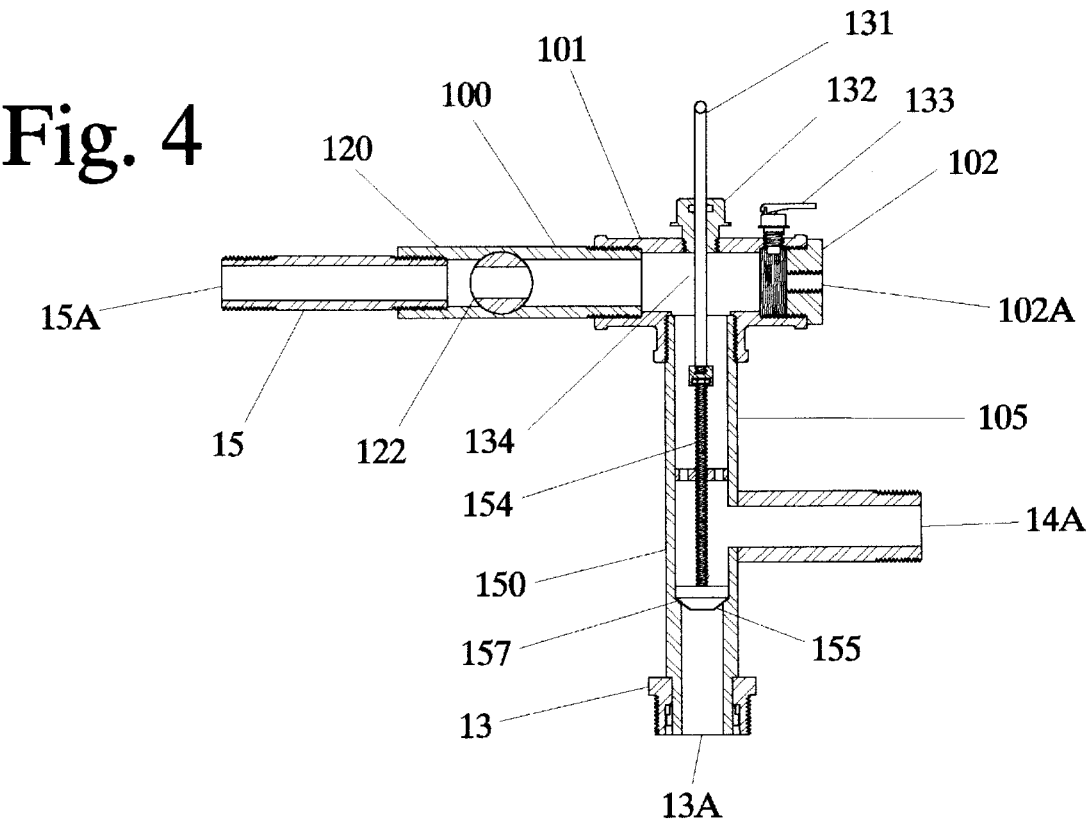
FIG. 4 illustrates a cross section view of the temporary valve assembly installed on the cross section view of the transfer valve assembly.

2. The temporary supply valve assembly 100, is screwed onto the transfer valve housing 150 as shown in FIG. 4.

3. Referring to FIG. 6, a temporary supply tank (not shown) is connected by means of a flexible connection 50 to the temporary gas supply inlet stem 15 of the temporary supply valve assembly 100 (Ref. FIG. 1). The temporary supply shut off valve 120, which typically is a ball valve, is opened. The pressure from the temporary supply tank is adjusted my means of a tank regulator which is normal equipment for temporary supply tanks to match the pressure of the gas flowing from the regulator 42.

The system can be purged of air by means of the purge valve 133.

4. Referring to FIGS. 2A, 3A, and FIG. 4, the transfer valve actuating "tee" handle 131 with the transfer valve mating block 134 which contains the hex socket 135 fits to and drives the transfer valve actuating head 156. The transfer valve actuating "tee" handle 131 is used to turn the transfer valve threaded actuating stem 154 from the position indicated in FIG. 3A until the transfer valve 155 is moved from the position shown in FIG. 3A to the position shown in FIG. 4, where the transfer valve 155 is sealing against the transfer valve primary sealing seat 157, shutting off the gas flow from the gas inlet from meter 13A which is the gas from through the meter 40 shown in FIG. 3.

At this point of the procedure, as shown in FIG. 6, gas will flow through the flexible connector to temporary supply tank 50 and out of the house supply gas outlet 14A with the directions of flow shown by the arrows E and D.

5. Referring to FIG. 5, the main supply shut off valve 41 is used to cut off the flow of gas into the meter 40 (Ref. FIG. 3). The meter 40 can now be removed and replaced or changed.

To revert back to normal service, the above steps are reversed.

Although the description above contains many specificities, these should not be construed as limiting the scope of the invention but merely providing illustrations of some of the presently preferred embodiments of this invention. For example, the gas outlet to meter 12 could have a male swivel end, or a female swivel end. The gas inlet coupling from meter 13 could be either a male or a female swivel coupling, depending on the mating connections that are on the gas meter 40 configuration. Similarly, the other threaded connections shown in FIG. 1 on the gas inlet from regulator 11, the temporary gas supply inlet stem 15, and the house supply outlet stem 14 can vary according to local practises and the hardware to which they will be connected. Also various threaded connections are shown at the junctures of various parts of the invention as an obvious means of asssembly of the parts.

There is nothing inventive about the choices of materials of construction. The piping and valves would typically those used in the industry, steel, for example, except for the seals which would typically be of plastic or an elastomeric material or other appropriate material for sealing purposes.

Thus the scope of the invention should be determined by the appended claims and their legal equivalents rather than by the examples given.

I claim:

1. A gas meter quick change meter bar comprising:
    a) a temporary supply valve assembly and
    b) a meter bar assembly comprising:
        i) a regulator-to-meter supply pipe,
        ii) a mount bar, and
        iii) a transfer valve assembly wherein said transfer valve assembly comprises:
            A) a transfer valve housing with:
                a gas inlet from a meter,
                a temporary valve gas inlet,
                a house supply gas outlet,
                a primary sealing seat, and
                a transfer valve mount threaded plug with a plurality of gas flow clearances, said transfer valve mount threaded plug threaded so as to receive a threaded stem of a transfer valve, said transfer valve to be moved between a primary sealing position on the primary sealing seat where said transfer valve seals against the primary sealing seat for bypassing gas through at least a portion of said transfer valve assembly through the plurality of gas flow clearances of the transfer valve mount threaded plug and into said supply gas outlet and
            b) said transfer valve with the threaded stem being translated by rotation within the threaded transfer valve mount plug with the plurality of gas flow clearances from a position where the transfer valve seals against the primary sealing seat for bypassing gas through said at least a portion of said transfer valve assembly to said supply gas outlet to a position where the plurality of gas flow clearances of the transfer valve mount threaded plug are sealed by the transfer valve, when the transfer valve assembly is being mounted to a gas meter prior to removal of the gas meter for servicing, so that the transfer valve with the threaded stem can also be translated by rotation from said position where the plurality of gas flow clearances of the transfer valve mount threaded plug are sealed back to sealing against the primary sealing seat to establish normal gas flow from said gas meter through said at least a portion of said transfer valve assembly and into said supply gas outlet for re-establishing the bypassing of gas through said at least a portion of said transfer valve assembly and into said supply gas outlet.

2. A transfer valve assembly comprising:
    a) a transfer valve housing with:
        i) a gas inlet from a meter,
        ii) a temporary valve gas inlet,
        iii) a house supply gas outlet,
        iv) a primary sealing seat, and
        v) a transfer valve mount threaded plug with a plurality of gas flow clearances, said transfer valve mount threaded plug threaded so as to receive a threaded stem of a transfer valve, said transfer valve to be moved between a primary sealing position on the primary sealing seat where said transfer valve seals against the primary sealing seat for bypassing gas through the transfer valve assembly through the plurality of gas flow clearances of the transfer valve mount threaded plug and into said supply gas outlet and
    b) the transfer valve with the threaded stem, being translated by rotation within the threaded transfer valve mount plug with the plurality of gas flow clearances from a position where the transfer valve seals against the primary sealing seat to a position where the plurality of gas flow clearances of the transfer valve mount threaded plug are sealed by the transfer valve, when the transfer valve assembly is being mounted to a gas meter prior to removal of the gas meter prior to servicing, and that at least a portion of said transfer valve with the threaded stem can also be translated by rotation from said position where the plurality of gas flow clearances of the transfer valve mount threaded plug are sealed back to sealing against the primary sealing seat.

* * * * *